Jan. 9, 1945.   W. H. NOELTING ET AL   2,366,927
SWIVELING BRAKE CASTER
Filed Jan. 2, 1943   2 Sheets-Sheet 1

INVENTORS.
WILLIAM H. NOELTING.
HARRY T. PROTHERO.
BY Lockwood, Goldsmith & Galt.
ATTORNEYS.

Jan. 9, 1945. W. H. NOELTING ET AL 2,366,927
SWIVELING BRAKE CASTER
Filed Jan. 2, 1943 2 Sheets-Sheet 2
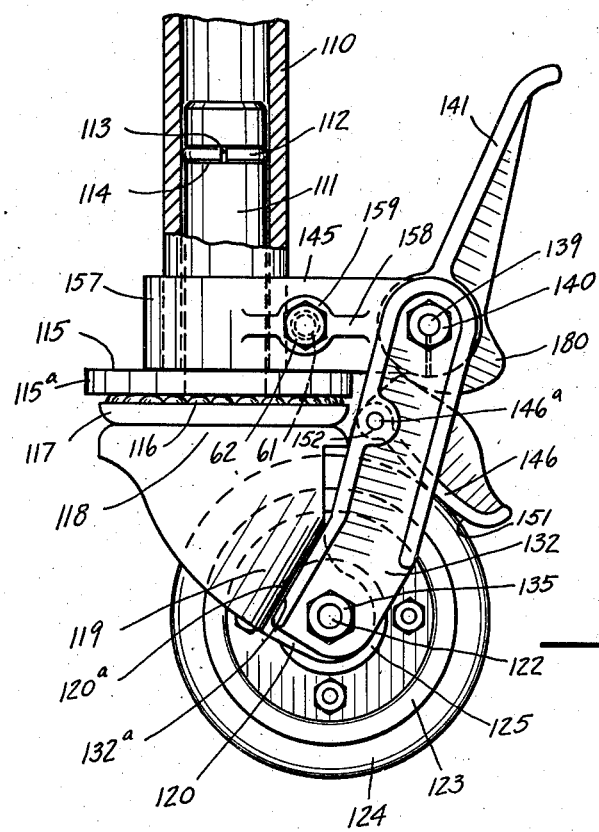
INVENTORS.
WILLIAM H. NOELTING.
HARRY T. PROTHERO.
BY Lockwood, Goldsmith & Galt.
ATTORNEYS.

Patented Jan. 9, 1945

2,366,927

UNITED STATES PATENT OFFICE 2,366,927

SWIVELING BRAKE CASTER

William H. Noelting and Harry T. Prothero, Evansville, Ind., assignors to Faultless Caster Corporation, Evansville, Ind., a corporation Application January 2, 1943, Serial No. 471,196

10 Claims. (Cl. 16—35)

This invention relates to a swiveling caster and more particularly to an addition in the form of a brake.

The chief object of this invention is to provide a brake structure which will stop rotation of the caster wheel and stop swiveling of the caster unit simultaneously.

The chief feature of the invention consists in providing a dual clamp for engaging the support for anchoring the caster thereto against swiveling and simultaneously clamping the wheel against rotation for complete immobilization of the caster structure.

Another feature of the invention, as suggested hereinbefore, is the formation of such a brake arrangement that the same is of attachment character, permitting application of the attachment to a conventional caster of the swiveling type.

Other objects and features of the invention will be set forth more fully hereinafter.

The full nature of the invention will be understood from the accompanying drawings and the following description and claims:

In the drawings,

Fig. 5 is a side elevational view of a modified form of the invention.

Fig. 6 is a perspective view of the camming lever shown in Fig. 5.

Fig. 7 is a perspective view of the wheel braking member shown in Fig. 5.

Figure 1:
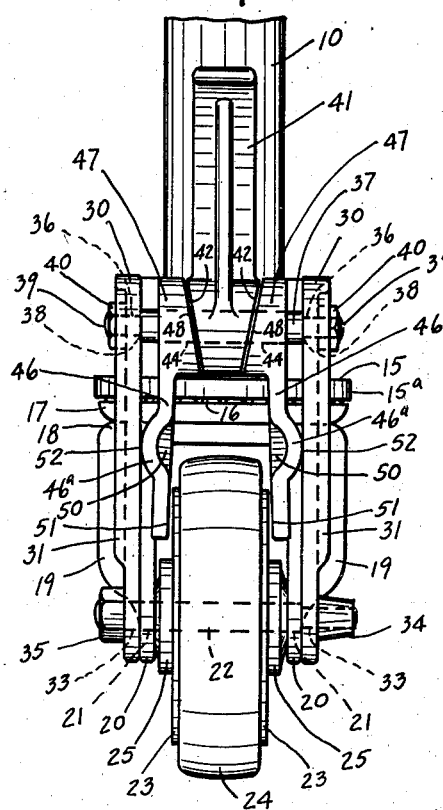
Fig. 1 is an elevational view looking toward the caster wheel and the rear of the attachment, the operating lever arm being shown in the inoperative position.
Figure 3:
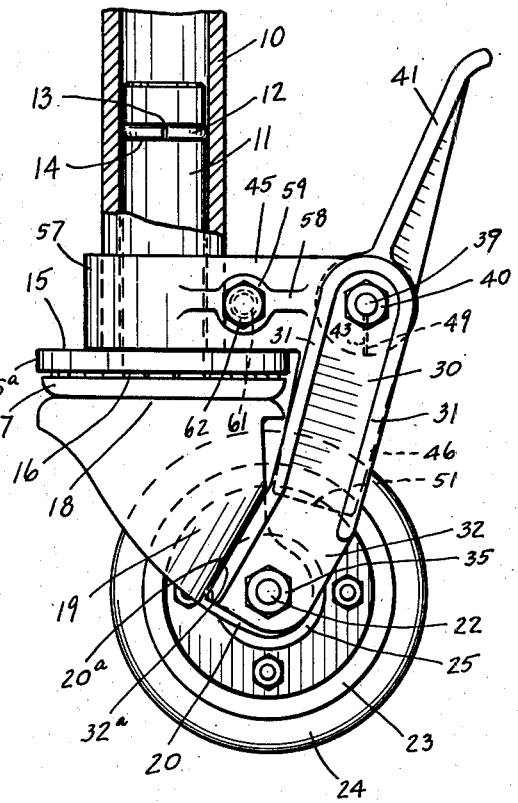
Fig. 3 is a side elevational view of the aforesaid.
Figure 2:
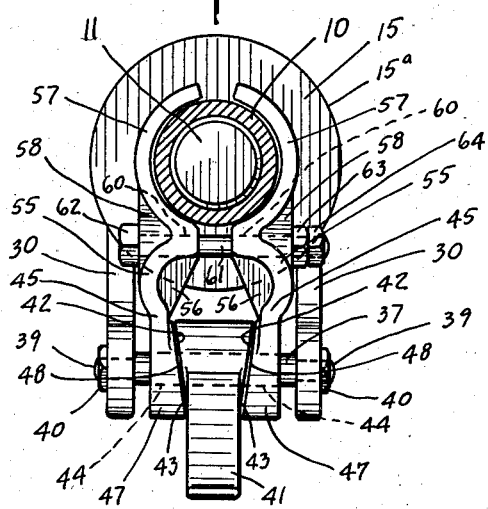
Fig. 2 is a top plan view of the aforesaid.

In Figs. 1 to 3 of the drawings 10 indicates the tube of a load structure and within the same is found the pintle 11 of a swiveling caster. One conventional method of retaining the caster structure to the tube is by means of the split band 12, split at 13 and seated in a recess or channel 14 in the pintle near the top thereof, which band is outwardly expansible to frictionally grip the interior of the tube for retention of the pintle in the tube. The aforesaid is a method of detachably connecting the pintle and load. Other conventional detachable connections may be employed. These may be of semi-permanent type. Also the pintle may be permanently connected to the load wherever desired. All such connections are well known in the caster art and require no further explanation nor any illustration thereof.

A cap or load plate 15 is centrally apertured and the pintle passes therethrough. This load plate includes a depending skirt portion 15a by which there is confined anti-friction elements 16 in the form of balls carried by a cup plate 17, which is also centrally apertured, that may be rigid with the yoke or horn having the upper circular portion 18 with depending ears 19 that terminate in parallel ends 20 apertured as at 21 to receive an axle 22 upon which is mounted a wheel structure having two side plates 23, a tread portion 24 and two cone arrangements, or the like, 25.

The central portion of the horn is centrally apertured and beneath this central portion 18 there is provided a lower member that is larger than the horn central aperture and the lower end of the pintle extends through this lower member and is enlarged laterally to retain the parts together in swiveling relation or the lower end of the pintle may be threaded and mount a nut for the same purpose.

Between this lower member and the underface of the horn, there may be included a second anti-friction series. Since all of the aforesaid is conventional caster construction, no further description or illustration thereof is believed necessary, except to state that when the pintle is inserted in the tube, the end of the same bears on the upper face of the plate 15 and the pintle and the connected caster cannot drop out of the tube, and normally the plate lower retaining member, last mentioned, and not illustrated, and the pintle do not rotate relative to the tube. However, the cup, horn, wheel and axle do swivel about the pintle axis and also the wheel freely rotates about the axle axis.

In certain constructions, such as large scaffolds and the like, it is necessary that the caster structure be immobilized relative to the tube 10. Heretofore, this has been effected broadly by braking action—that is, a brake bears upon the periphery of the plate, before mentioned, and bears upon the periphery of the wheel. This construction has the disadvantage of wearing upon the caster tread or wheel surface with the result that after slight use, this surface is not round and true but is cupped, marred and otherwise deformed so that such a scaffold can only be moved with considerable difficulty due to the faulty formation of the wheel tread surface.

The present invention, therefore, contemplates broadly, the same fundamental operation, towit, prevention of caster swiveling and prevention of wheel rotation without deforming, marring, or the like, any of the moving parts.

Referring more specifically to the preferred form of the invention herein illustrated in Figs. 1 to 3 as an attachment, although the same need not necessarily be so fabricated, it will be observed that a pair of elongated uprights or support members 30 are provided which for reenforcement, are provided with vertically directed rib means 31.

The lower ends of these members are slightly offset angularly as at 32 and since the junction 20a between the flat portion 20 and the body or arcuate portion 19 of the ear is in effect an abutment arrangement, the edge 32a of the upright or support member 30 may cooperate therewith for locating the support member 30, as shown in Fig. 3.

Inasmuch as a cone type support is utilized and interposed between the ear ends 20 and the wheel, it is quite apparent that axle pressure on the ears has no effect on wheel rotation. Accordingly, therefore, the support members 30 apertured as at 33, have the axle 22 extended therethrough and the two uprights are rigidly clamped in proper position to the ears of the yoke by suitable means, such as the head 34 and the nut 35 on the axle portion 22. This means the uprights are rigid with the yoke and swivel therewith. The uprights at their upper end are apertured as at 36.

A member 37 which is slightly reduced at opposite ends forming shoulders 38 has its ends seated in the apertures 36. This member may have the reduced ends 39 and mount nuts 40, and when the nuts are drawn tight, it will be apparent that there is provided a circular bearing between the two supports, which is rigid with the yoke and this bearing has a longitudinal axis appreciably above the wheel axis and offset relative to the pintle axis to a greater degree than the wheel axis is offset therefrom.

From the foregoing, therefore, it will be quite clear that a standard swiveling caster may be provided with an upright or support arrangement as herein disclosed and by merely utilizing a longer wheel axle.

The clamping construction includes two spaced, generally angle shaped, clamping levers mounted at their vertices upon the aforementioned overhead support 37. Also mounted on the overhead support 37 and between these two angle members is the operating lever 41, see Fig. 4. This operating lever has two divergingly directed opposed faces 42 which are substantially circular in side elevation and the two resulting spaced apart terminations provide a stop shoulder, the two opposed shoulders being in alignment and in effect forming faces lying in a radial plane of the central portion of the operating lever. These faces are designated by the numeral 43.

There is provided, as stated, a pair of angular-like clamping members which are apertured coincident with their vertex as at 44. One arm portion is designated by the numeral 45, this being the upper portion. The depending arm portion is designated by the numeral 46. The central or hub portion 47, which is apertured at 44 for mounting on the support member 37, has a complementary cam face 48 and this cam face is circular, as it were, and the ends are joined by a face 49 which is radially directed and which lies in a substantially vertical plane and at the lower portion of the central portion of the angle lever and is adapted for engagement by the cooperating shoulder 43, thereby limiting the counter-clockwise tilting of the operating lever 41 and preventing movement beyond that shown in Fig. 3.

Each depending portion 46 of the angular member intermediate the hub portion 47 and the lower end, includes an outwardly directed, arcuate enlargement 46a which may be reenforced by ribbing 50, if desired. The lower end of the depending arm portion 46 is provided with an inwardly directed flat face 51 that is juxtapositioned relative to the adjacent plate portion 23 of the wheel 24. The arcuate enlargement 46a bears on the inside face of the upright support member 30 as at 52. This is a fulcrum for this lever member.

When the angle member is moved from what may be termed the median position at the hub portion toward its adjacent support member, since the depending portion is fulcrumed at 52, the bearing face 51 of necessity moves inwardly toward the wheel and engages the side plate 23 thereof. Simultaneous movement outwardly, therefore, of the hub portions 47 of the angle members causes simultaneous inward movement of the faces 51 so that the wheel is clamped therebetween and held against rotation. There, therefore, is no wear on the tread of the wheel, thereby leaving it at all times smooth, uncupped and unmarred, except such deformation as may occur incident to normal use of a caster.

The foregoing constitutes the wheel clamping portion of the attachment. Reference now will be had to the arrangement for prevention of caster swiveling and for convenience only, the same is so arranged to grip the tubular leg that receives the pintle. The upper leg 45 of each angular lever is provided with an arched portion 55 suitably reenforced as at 56 and the free end of said portion 45 terminates in a partially cylindrical formation 57, which is connected to intermediate portion 55 by the reenforcing rib arrangement 58.

This reenforcing rib arrangement is enlarged vertically as at 59 and the two upper portions of the angle levers are apertured as at 60. A bolt 61 extends therethrough and suitable means in the form of a head 62, an adjusting nut 63 and locknut 64 connects the two upper portions 45 of the angle levers together in predetermined relation. Since the outside diameter of the tubular leg 10 may vary, this adjustment is provided so that the two substantially semi-cylindrical portions 57 may be closely positioned in opposed relation about the tubular leg without engaging same, at least if any engagement is present, it is of non-clamping character.

When the two hub or central portions of the angle levers are caused to separate through the cam action of the operating lever, the upper portion 45 fulcrums on the retainers of the connecting member 61 and the semi-cylindrical portions 57 moves toward the tube 10. Since as stated, both hubs are caused to separate simultaneously and to a like degree, both semi-cylindrical portions 57 are caused to approach each other simultaneously and to a like degree and thus the tube 10 is clamped therebetween and without any tilting of the entire arrangement from a vertical plane, including the operating lever. This elminiates all undesired strains.

When the operating lever is moved clockwise downwardly, see Fig. 3, so that its free end is positioned adjacent the wheel, not only will the faces 51 clamp the wheel against rotation but the cylindrical portions 57 will clamp the tube and prevent caster swiveling.

Whenever it is desired, the support members may be angular, in which event a wing portion will extend inwardly from the upper end toward the caster pintle and these may be suitably joined together or if sufficiently reenforced, may be so rigid as to prevent any tendency to separate when engaged by the arcuate outer face of the portion 55. This is merely a substitute fulcrum in a modified form of the invention. The operation is identical.

Whenever it is desired to clamp the plate 15 and not the tube 10, it will be quite apparent that the semi-cylindrical portions 57 may be so positioned that they will not engage the tube but depending portions thereon will engage opposite sides of the skirt portion 15a of the plate and thus clampingly engage the plate and immobilize the caster so as to prevent swiveling. This is a second modification that incorporates the basic principle of two angle levers, each arm of which is fulcrumed intermediate its ends and the free end is of clamp engaging character and the common hub portion is movable through a cam arrangement, the two angle levers being mounted in opposed relation with a single operating cam therebetween for effecting separation movement of the hub to insure clamping action by the fulcrumed arms, fulcrumed as aforesaid.

It is not believed necessary having clearly described the construction and operation of the preferred form of the invention, to illustrate the two other modifications which are accordingly, obvious.

The preferred form of the invention is one that embodies no springs whatsoever. It consists essentially, summarizing, a support structure rigid with the yoke, two angle clamping levers with cam type vertices and a singular intermediate operating cam lever, each arm of the angle levers being fulcrumed intermediate its ends, the free ends being of clamping character and the common or hub portion being the power movable portion of the lever.

It will also be apparent that as initially stated herein, the preferred embodiment of the invention may be fabricated as an attachment and only requires the addition of a longer wheel axle for utilization and application to a conventional swiveling caster. The parts are small, few in number and simple in character and readily lend themselves to quantity production, some partaking of drop forging or malleable casting formation.

Whenever desired in place of an angular lever, two levers may be provided having coaxial hubs, that immediately adjacent the operating lever having the cooperating cam face. In this form, the four levers must be located and capable of the longitudinal movement required.

In Fig. 5 there is illustrated a second embodiment of the invention. Numerals of the one hundred series herein indicate parts identical or similar to those of the first form and designated by the corresponding primary numerals. Herein the invention is again illustrated as of the attachment type.

In this form of the invention the attachment is mounted on the tubular leg 110 and on the caster wheel axle 122 as before. When the lever 141, see Figs. 5 and 6, is moved clockwise the portions 157 clamp the tube and since the attachment is carried by the wheel axle, the swiveling portion of the caster is held against swiveling as previously described.

Herein the wheel braking is effected simultaneously by operation of member 141, see Figs. 5 and 6. As shown in Fig. 6, the lever 141 carries a cam portion 180 depending and projecting outwardly from the same between the inclined faces of said lever. Pivotally mounted in aperture 152 in the support member 132 is a braking member or shoe having stub shafts 146a seated in the apertures 152. This shoe, see Figs. 5 and 7, has wheel tread engaging face 151 and a central upwardly directed cam engageable rib 150.

When lever 141 is depressed, cam 180 is rotated and bears upon the upper face of rib 150 to cause the opposite face 151 of the brake shoe to engage the wheel tread, thus preventing caster wheel rotation.

A leaf spring may be suitably supported by members 132 and normally constrain the shoe upwardly into non-tread engaging position. Also a tension spring could be connected to an ear on the brake shoe and to members 132 in non-interfering relation to effect the same result.

Figure 4:
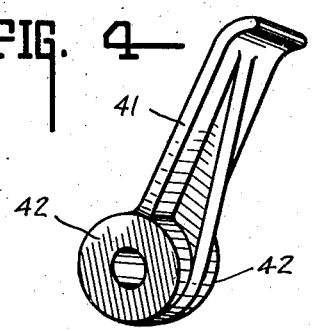
Fig. 4 is a perspective view of the camming lever shown in Figs. 1 to 3.

Whenever it is not objectionable to have the shoe lightly ride the wheel tread in wheel rotation, no spring need be employed, for gravity will position the shoe as illustrated in Fig. 4 and pressure thereof will not be material. Only when the lever 141 is depressed will the shoe exert effective braking pressure on the wheel sufficient to stop wheel rotation and, of course, simultaneously lock the caster against swiveling as well.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In a swiveling caster having a caster wheel, a horn and means for attachment to a tubular, load supporting member, the combination of support means rigid with the horn of such caster and having a pivot and support portion radially offset from the caster wheel and laterally offset from the swiveling axis of the caster, a cam type operating lever pivoted on the support means pivot and having opposed cam faces, and a pair of angular shaped clamping means supported at their vertices by the support means pivot, said clamping means at their vertices having cam faces confronting the lever opposed cam faces for operative engagement therewith, each angular means between an end and the vertex having a fulcrum bearing portion, that end terminating in a clamping portion, the confronting clamping end portions being movable towards each other for clamping purposes, the other ends of the angular means also being movable towards each other for clamping purposes, one pair of ends at least partially embracing the member, and the second pair of ends terminating at opposite sides of the wheel, said lever when pivoted upon the pivot causing relative axial movement of the angular means vertices by reason of cam face engagement and for member and wheel clamping by the said angular means.

2. A caster as defined by claim 1 wherein the angular means between the vertex and the said other end has an additional fulcrum bearing portion, each additional fulcrum bearing portion having operative bearing upon said support means.

3. A caster as defined by claim 1 wherein fulcrum means is provided independent of said support means for fulcrum bearing portion engagement.

4. A caster as defined by claim 1 wherein fulcrum means is provided independent of said support means for fulcrum bearing portion engagement, and the angular means between the vertex and the said other end has an additional fulcrum bearing portion, each additional fulcrum bearing portion having operative bearing upon said support means.

5. A caster as defined by claim 1 wherein fulcrum means is provided independent of said support means for fulcrum bearing portion engagement, said fulcrum means being of adjustable character for determining the initial and nonclamping position of the said angular means.

6. A caster as defined by claim 1 wherein fulcrum means is provided independent of said support means for fulcrum bearing portion engagement, said fulcrum means being of adjustable character for determining the initial and nonclamping position of the said angular means, and the angular means between the vertex and the said other end has an additional fulcrum bearing portion, each additional fulcrum bearing portion having operative bearing upon said support means.

7. In a swiveling caster having a caster wheel, a horn and means for attachment to a tubular load supporting member, the combination of support means rigid with the horn of such caster and having a pivot and support portion radially offset from the caster wheel and laterally offset from the swiveling axis of the caster, means mounted on the support means and above the wheel and having a portion for wheel engagement to prevent wheel rotation, other means mounted on the support means and above the horn and having end portions at least partially embracing the member, and a cam type operating lever pivoted on the support means pivot and having opposed cam faces, said other means having cooperating cam faces confronting said lever, tilting of the cam lever effecting prevention of wheel rotation and yoke swiveling by simultaneously causing the said other means ends to clamp the tubular member and said third mentioned means to pressure engage said wheel.

8. A caster as defined by claim 7 wherein the third and fourth mentioned means are integral and are angularly directed relative to each other.

9. A caster as defined by claim 7 wherein the third mentioned means includes a centrally positioned cam portion, and the cam type lever includes a cam portion cooperating therewith and between the cam faces.

10. In a swiveling caster having a caster wheel, a horn having ears straddling same, an axle carried by the horn ears and rotatably mounting the wheel, and means for attachment to a tubular load supporting member including a pivotal connection to the horn, the wheel and horn axes being offset laterally of each other, the combination of support means of inverted U-shaped character, straddling the wheel and ears and secured to the latter at the axle and projecting upwardly therefrom and outwardly relative to the attaching means, said support means providing a pivot spaced radially from the axle axis remote from the wheel and spaced from the horn swiveling axis, a cam type lever supported by the last mentioned pivot, and cam including means actuatable by the lever in the tilting thereof for member and wheel engagement to prevent wheel rotation and horn swiveling and carried by said U-shaped support means.

WILLIAM H. NOELTING.
HARRY T. PROTHERO.